F. A. JOHNSON.
ROTARY CARRIER.
APPLICATION FILED FEB. 28, 1908.
939,700.
Patented Nov. 9, 1909.
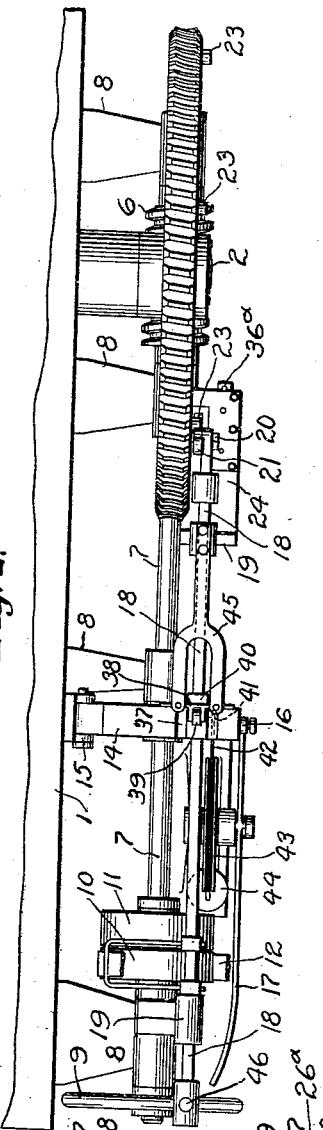
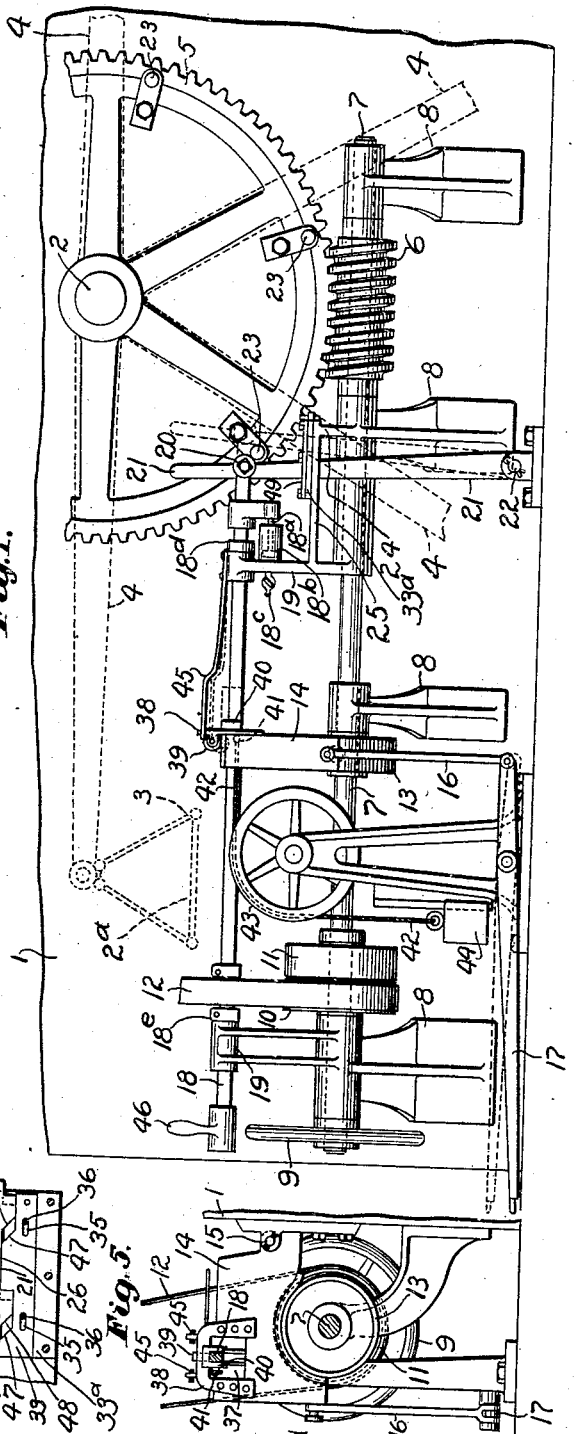
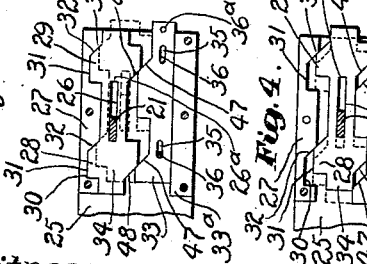
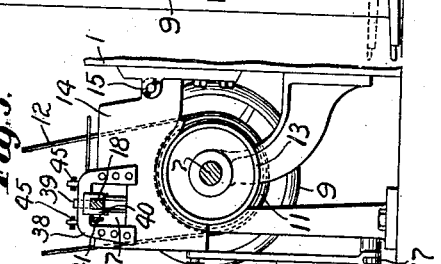
Witnesses:
Edwin T. Luce
Robert H. Kammler
Inventor:
Frank A. Johnson,
by Emery & Booth
Attys.

UNITED STATES PATENT OFFICE.

FRANK A. JOHNSON, OF SALISBURY, MASSACHUSETTS.

ROTARY CARRIER.

939,700.

Specification of Letters Patent.

Patented Nov. 9, 1909.

Application filed February 28, 1908. Serial No. 418,214.

*To all whom it may concern:*

Be it known that I, FRANK A. JOHNSON, a citizen of the United States, and a resident of Salisbury, in the county of Essex and State of Massachusetts, have invented an Improvement in Rotary Carriers, of which the following description, in connection with the accompanying drawings, is a specification, like characters on the drawings representing like parts.

It is customary for bakers and others who bake large quantities of certain kinds of food to employ a revolving pan carrier upon which the pans containing the food to be baked are placed, the carrier being constructed to revolve within the oven upon a shaft arranged to enter the oven through one of the sides thereof, and to be revolved by any convenient means, the path of revolution of the carrier being so near the door of the oven that the food to be baked can be placed upon and removed from pans or shelves of the carrier at the oven door.

The pan carrier revolves at a predetermined speed, and it having been ascertained that a stated kind of food will be baked and ready to be removed from the oven in a given time, it is easy to determine that time by giving to the wheel the required number of revolutions.

Heretofore, it has been customary to employ an assistant to stop and start the carrier as well as to assist the baker in putting the food into and removing it from the oven; but as, many times, the services of the assistant are not required to assist the baker for the latter purpose, an additional expense is entailed in employing him for the sole purpose of stopping and starting the carrier; and there is, furthermore, the danger that he will neglect at times, to stop the carrier at the proper time.

The object of my invention is to provide an automatic device for stopping the pan carrier as desired.

In the embodiment of my invention selected for illustration herein, as each pan arrives opposite to the oven door, the carrier may be arrested so that the contents may be removed from the pans in succession as they reach this point, and a fresh supply of food to be baked placed upon the pan or shelf.

In the drawings,—Figure 1 is a side view of an oven partially broken away, showing my stop device as applied to the ordinary revolving pan carrier referred to; Fig. 2 is a plan view of the same; Figs. 3 and 4, detail views of the slide member and guide members; and Fig. 5 is a side view of the brake mechanism.

Referring first to Fig. 1, 1 is the side wall of the oven partially broken away; 2 the shaft extending through the oven, upon which the wheel is mounted carrying the pan or shelf supporting arms, as shown in the dotted lines at 3 and 4, the pans or shelves being indicated at $2^a$. Upon the end of the shaft 2 at a suitable distance from the wall of the oven is secured the worm wheel 5, in mesh with a worm 6 upon a shaft 7 suitably supported in bearings in brackets 8, or other supports secured to the wall of the oven or floor, as may be desired. At the opposite end of the shaft 7 from the worm 6, or at any convenient point, is a balance wheel 9, which also serves as a hand wheel, for starting and stopping the machine when desired.

At suitable points upon the shaft 7 are fast and loose pulleys 10 and 11, by means of which, in connection with the belt 12, power may be supplied from any convenient source. At a suitable point, also, upon the shaft is a brake-wheel 13, just above which is the brake shoe 14 hinged at 15 to the oven wall or to any other convenient support (Fig. 5) to permit it to be removed from and applied to the wheel 13. The shoe is provided with a rod 16, one end of which is attached to the treadle 17 by means of which the shoe may be released from the brake wheel when desired. The treadle may, of course, be placed at any convenient point for the operator.

The belt is controlled by means of the shipper bar 18 properly mounted in bearings in the posts 19 supported by the brackets 8. The shipper bar 18, at one end, is pivotally connected by a pin 20 to the shipper lever 21, pivoted at 22 to a suitable support. The lever is provided with a longitudinal slot to permit the pin 20 to have the required vertical movement as the bar 18 and lever 21 are moved.

The carrier wheel 5 is provided at predetermined intervals upon its rim with transversely extending pins 23 usually one for each pan or shelf, which pins are adjustably secured by clamp members $23^a$, and the shipper lever 21 is mounted in the path of revolution of these pins.

Upon the bracket 8 beneath the wheel 5 and on a support 24 is a plate 25 (Figs. 1 and 3), slotted at 26 to receive the shipper lever. Secured upon this plate is the guide member 27, having two recesses 28, 29 at its inner edge, one side of each recess having a straight wall 30 and the opposite side an inclined wall 32. Opposed to this member is the guide member 33 provided with recesses having similar but reversed faces. Between these members is arranged a slide member 34 provided with coöperating inclined faces and also with a slot 26$^a$ to receive the shipper lever and register with the slot 26 in the plate 25.

The member 27 is secured to the plate 25, but the member 33 is provided with slots 35 by means of which, together with the pins 36 which enter holes in plate 25 below, and pin 36$^a$ which abuts the edge of member 25, it may be made to occupy either of two positions, as shown in Figs. 3 and 4, for a purpose to be described.

The brake shoe is also provided with the inverted U-shaped member 38, in turn provided at its under side with the roller 39 which bears upon the upper surface of a block 40 on the rod 18 and upon the upper surface of rod 18 and permits free movement thereof with but little friction.

The mode of operation of the machine is as follows:—the parts being in the position shown in full lines in Fig. 1, with the pans or shelves carrying the articles to be baked during one revolution of the carrier, for illustration, the carrier is revolved in the direction of the arrow by means of the connections described. As the pan 2$^a$, being the first one filled, and having made one revolution with the wheel, approaches the oven door, a pin 23 comes in contact with the shipper lever 21 and, as the wheel continues to revolve, forces the lever forward to dotted line position Fig. 1. Referring to Fig. 3, the lever 21 is shown in the position it occupies when the pin 23 first comes into contact with it. The wheel 5 continuing to revolve forces the lever forward in the slot 26, and when the lever reaches the end of the slot it forces the slide 34 forward from the position it normally occupies and the lever and shipper bar 18 shift the belt to stop the wheel. As the slide 34 moves forward, the beveled faces thereon referred to, force said slide to one side thereof, throwing the lever 21 also so far laterally from the plane in which it normally rests as to clear the pin 23 as the wheel stops.

Attached to the shipper block 40 at 41 is a rope or chain 42, which runs over a pulley 43, conveniently located, and to the other end of which is attached the weight 44. As the rod 18 is carried forward or to the right by the rotation of the carrier 5, the block 40 moves forward and, at the same time, raises the weight 44. When the block 40 in its travel reaches the point shown in dotted lines, it slips out from under the member 38 and permits that member and the brake shoe 14 to drop upon the brake wheel 13 to arrest the carrier, the block 40 being prevented from returning to its former position by its rear end above the rod 18, abutting against the member 38. The block 40 slides from beneath the member 38 at the same instant the slide 34 reaches the point where it forces the lever 21 laterally beyond the point of contact with the pin 23. The member 38 is supported laterally by the forked rod 45 secured thereto and also to the arm 19, so that the pull of the weight 44 will not tend to dislocate the shoe 14. The brake shoe 14 (see Fig. 5) is cut away at 37 to permit the shoe to be raised from contact with the wheel 13 without coming into contact with the shipper rod 18.

When it is desired again to start the carrier the attendant by placing his foot upon the treadle 17 raises the shoe 14 from contact with the brake 13, permitting the weight 44 to return the shipper bar and block to their normal positions, to carry the belt onto the fast pulley to start the carrier, returning at the same time, the lever 21 and slide 34, the lever being then ready to be again engaged by the next pin of the series.

The rod 18 is provided upon its under face with the piston 18$^a$ adapted, as the rod 18 is returned by the weight 44, to enter a dash pot 18$^b$ secured to any convenient support and provided at its rear end with the valve 18$^c$ to permit the air forced out by the piston 18$^a$ to escape slowly, forming a cushion stop for the block 40 and bar 18 on their return. The bar 18 is also provided with block 18$^d$ secured thereto at a suitable point, which together with block 18$^e$, part of the shipper device, acts as a stop for the bar 18 when it reaches the end of its backward movement, by abutting against bracket 19 and receiving the strain of the weight 44. The shipper bar 18 is provided with a handle 46 in order that the bar may be operated by hand when preferred.

The carrier may be permitted to revolve continuously for any length of time by removing the pin 36$^a$ from the position shown in full lines Fig. 3, in contact with the edge of the plate 25 below the member 33, which permits the lever 21, when it is returned by the weight 44, to take with it the member 33, thereby preventing said plate 34 from returning the lever 21 laterally into the path of travel of the wheel pins 23 and permitting the carrier to continue to revolve until the guide member 33 is again moved forward and the pin 36$^a$ replaced in its former position.

The plate 49 is removably secured over the slide and guide members shown in Fig. 4 and referred to, to keep said parts in position and prevent anything from coming into contact with slide 33 to interfere with the movements thereof; and a member 33ª is provided to act also as a guard for the guide member 33.

It is obvious that many modifications of my invention may be made without departing from the spirit and scope thereof, and having described an embodiment thereof, I claim:

1. In a machine of the class described, a revolving carrier, a worm shaft to impart motion thereto having fast and loose pulleys thereon, a shipper bar, a shipper lever movably connected to said shipper bar, means on said carrier to operate said shipper bar to stop the said carrier, a brake and locking means rendered operative upon movement of said shipper bar to arrest said carrier, means to release said brake and locking means and return said shipper lever to operative position, a supporting member for said brake and locking mechanism and anti-friction means between said brake and locking mechanism and said shipper bar, a cushioning device to permit gradual return of said shipper bar, a base member, guide members thereon and presenting to each other faces of irregular outline, a slide member adapted to move between said guide members, means to retain said slide member in position, said base member having means permitting the reciprocation of the lever to cause similar reciprocation of said slide member, and means to adjust one guide member to permit the slide member to return the lever without the path of normal reciprocation.

2. In a machine of the class described, a revolving carrier, a worm shaft to impart motion thereto having fast and loose pulleys thereon, a shipper bar, a shipper lever movably connected thereto, means on said carrier to operate said shipper bar to stop the said carrier, means to change the plane of oscillation of said shipper bar, a brake and locking means rendered operative upon movement of said shipper bar, to arrest the said carrier, means to release said brake and locking means and additional means to return said shipper lever to continuous operative position, and a supporting member for said brake and locking mechanism and anti-friction means between said brake and locking mechanism and said shipper bar.

3. In a machine of the class described, a revolving carrier, a worm shaft to impart motion thereto having fast and loose pulleys thereon, a shipper bar, a shipper lever movably connected to said shipper bar, means on said carrier to operate said shipper bar to stop the said carrier, slide and guide members to control the plane of oscillation of said shipper bar, a brake and locking means rendered operative on movement of said shipper bar, to arrest said carrier, means to release said brake and locking means and additional means to return said shipper lever to operative position, a supporting member for said brake and locking mechanism, anti-friction means between said brake and locking mechanism and said shipper bar, and means to provide gradual return of said shipper bar.

4. Actuating and stop mechanism for a revolving carrier, comprising a worm shaft having fast and loose pulleys thereon to impart motion to the carrier, a shipper bar, a shipper lever movably connected thereto, shipper lever actuating means adapted to be mounted upon the carrier to actuate said lever to stop the carrier, a brake and locking means rendered operative upon movement of said shipper bar to lock said carrier against rotation, means to release said brake and locking means and return said shipper lever to former position, a supporting member for said brake and locking mechanism and anti-friction means between said brake and locking mechanism and said shipper bar, a cushioning device to permit gradual return of said shipper bar, a base member, guide members thereon presenting to each other faces of irregular outline, a slide member adapted to move between said guide members, means to retain said slide member in position, said base member having means permitting the reciprocation of the lever to cause similar reciprocation of said slide member, and means to adjust one guide member to permit the slide member to return the lever without the path of normal reciprocation.

5. A rotary carrier, means automatically to arrest rotation thereof at desired times, and a slide member and guide members therefor to change the plane of oscillation of the automatic motion arresting means above its fulcrum and to simultaneously throw one member of the stopping means into continuous rotation relation to said carrier and means to rotate said carrier irrespective of said stopping means.

In testimony whereof, I have signed my name to this specification, in the presence of two subscribing witnesses.

FRANK A. JOHNSON.

Witnesses:
EVERETT S. EMERY,
ROBERT H. KAMMLER.